US011242190B2

(12) United States Patent
Costle et al.

(10) Patent No.: US 11,242,190 B2
(45) Date of Patent: Feb. 8, 2022

(54) AEROSOL DISPENSING CAP FOR AUTOMATED INSTALLATION

(71) Applicant: ILLINOIS TOOL WORKS INC., Glenview, IL (US)

(72) Inventors: Carey Christopher Costle, Tucson, AZ (US); Stephen Edward Richey, Atascadero, CA (US); Brendan Sangster, San Luis Obispo, CA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/825,487

(22) Filed: Mar. 20, 2020

(65) Prior Publication Data

US 2020/0299054 A1      Sep. 24, 2020

Related U.S. Application Data

(60) Provisional application No. 62/820,951, filed on Mar. 20, 2019.

(51) Int. Cl.
| | |
|---|---|
| *B65D 83/20* | (2006.01) |
| *B65D 83/40* | (2006.01) |
| *B65D 83/22* | (2006.01) |
| *B65D 83/30* | (2006.01) |
| *B65D 83/32* | (2006.01) |
| *B29D 30/06* | (2006.01) |
| *B65D 83/14* | (2006.01) |

(52) U.S. Cl.
CPC ......... *B65D 83/20* (2013.01); *B29D 30/0685* (2013.01); *B65D 83/226* (2013.01); *B65D 83/303* (2013.01); *B65D 83/32* (2013.01); *B65D 83/40* (2013.01); *B65D 83/756* (2013.01); *B29D 2030/0698* (2013.01)

(58) Field of Classification Search
CPC .... B65D 83/20; B65D 83/226; B65D 83/303; B65D 83/32; B65D 83/756; B29D 2030/0698
See application file for complete search history.

(56) References Cited

U.S. PATENT DOCUMENTS

| | | |
|---|---|---|
| 549,603 A | 11/1895 | Jeffery |
| 906,158 A | 2/1908 | Raymond |
| 1,492,838 A | 5/1924 | Dilweg |
| 4,276,898 A | 7/1981 | Ross |
| 5,282,551 A | 2/1994 | Pierson |
| 5,305,784 A | 4/1994 | Carter |
| 5,517,732 A | 5/1996 | Crear |
| 6,260,739 B1 | 7/2001 | Hsiao |
| 6,382,469 B1 | 5/2002 | Carter et al. |
| 6,431,225 B1 | 8/2002 | Dudley |

(Continued)

*Primary Examiner* — Jeremy Carroll
(74) *Attorney, Agent, or Firm* — Pauley Erickson & Swanson

(57) ABSTRACT

A device for dispensing pressurized air and/or tire sealant from a pressurized can. The device comprising a cap body, a depressor button with a lock clip, and a hose positioned within the cap body attached to the pressurized can. The lock clip locks the depressor button in the compressed position for ease during use, while a shield element keeps the depressor button in the non-compressed position for safety during non-use. The hose provides an extension to attach to a tire stem valve, while being stored and attached to the cap body of the device.

20 Claims, 9 Drawing Sheets

(56) References Cited

U.S. PATENT DOCUMENTS

| | | | |
|---|---|---|---|
| 6,708,849 B1 * | 3/2004 | Carter | B65D 83/20 |
| | | | 222/153.1 |
| 7,028,720 B2 | 4/2006 | Eckhardt | |
| 7,487,891 B2 | 2/2009 | Yerby et al. | |
| 7,694,698 B2 | 4/2010 | Marini | |
| 7,757,905 B2 * | 7/2010 | Strand | B65D 83/206 |
| | | | 222/402.11 |
| 7,854,242 B2 | 12/2010 | Stehle | |
| 8,087,552 B2 | 1/2012 | Fazekas et al. | |
| 8,100,298 B2 | 1/2012 | Marquardt et al. | |
| 8,127,968 B2 | 3/2012 | Yerby et al. | |
| 8,205,645 B2 | 6/2012 | Dowel | |
| 8,360,119 B2 | 1/2013 | Huang et al. | |
| 8,453,684 B2 | 6/2013 | Lolli | |
| 8,517,227 B2 | 8/2013 | Strand et al. | |
| 8,627,857 B2 | 1/2014 | Chou | |
| 8,640,745 B2 | 2/2014 | Ji | |
| 9,050,866 B2 | 6/2015 | Hong | |
| 9,193,229 B2 | 11/2015 | Hong | |
| 9,227,600 B2 | 1/2016 | Chen | |
| 9,242,416 B1 * | 1/2016 | Ohm | B29C 73/166 |
| 9,457,367 B2 | 10/2016 | Wang | |
| 9,492,976 B2 | 11/2016 | Hong | |
| 10,030,800 B2 | 7/2018 | Wang | |
| D830,507 S | 10/2018 | Kanenari | |
| 2003/0001124 A1 | 1/2003 | Chen | |
| 2004/0099696 A1 * | 5/2004 | Stratemeier | B65D 83/7535 |
| | | | 222/402.1 |
| 2005/0167528 A1 * | 8/2005 | Hsiao | B65D 83/303 |
| | | | 239/302 |
| 2011/0068132 A1 * | 3/2011 | Kou | B65D 83/24 |
| | | | 222/402.13 |
| 2013/0255790 A1 | 10/2013 | Cherry, Sr. | |
| 2015/0233485 A1 | 8/2015 | Cheng | |
| 2016/0332397 A1 * | 11/2016 | Marini | B65D 83/303 |
| 2018/0037400 A1 * | 2/2018 | Kuntzelman | B29C 73/025 |
| 2018/0229456 A1 | 8/2018 | Costle et al. | |

* cited by examiner

AEROSOL DISPENSING CAP FOR AUTOMATED INSTALLATION

CROSS REFERENCE TO RELATED APPLICATION

This application claims the benefit of U.S. Provisional Application, Ser. No. 62/820,951, filed on 20 Mar. 2019. This U.S. Provisional Application is hereby incorporated by reference herein in its entirety and are made a part hereof, including but not limited to those portions which specifically appear hereinafter.

BACKGROUND OF THE INVENTION

Field of the Invention

The invention relates to a device for releasing air and/or tire sealant from a container, to a tire, by means of a pressure source.

Description of Prior Art

Tire repair devices are primarily used for introducing air and/or tire sealant into defective tires when a flat tire occurs and for sealing a defective tire. Current devices include cans of pressurized air and/or sealant with a can topper and removable upper cap adapted to connect to a tire stem with an optional hose, and inject the can contents into the tire.

SUMMARY OF THE INVENTION

The present invention provides an apparatus for the cap of a pressurized can, including a hose for releasing the can contents. The apparatus of this invention includes a dispensing assembly that goes on the top of a can. The apparatus of this invention includes an integrated valve and locking feature, a locking mechanism built into a valve depressor button, and a hose contained within the cap body.

The invention includes a device for dispensing pressurized air and/or tire sealant from a pressurized can, wherein the device includes a cap body base with a depressor button that connects to fluid inside the pressurized can. A hose is also positioned within the cap body and is also attached with respect to the pressurized can. The hose has an end that may attach to a stem valve of a tire. The hose also attaches to an opening in the depressor button, whereby a length of the hose extends out from the opening and wraps around a surface of the cap body. The hose is made up of a length and two ends; a first end which connects to the opening of the depressor button, and an opposite end which includes the end configured to attach to a stem valve.

The depressor button of the device sits inside a cradle on the cap body. The cradle also has a lock clip which is able to hold and lock the depressor button in a compressed position when the depressor button is pressed. The depressor button is also partially encompassed by a shield element. The shield element is removably attached to the depressor button by at least one flexible joint. The shield element and at least one flexible joint allow the depressor button to resist compression. This resistance is eliminated when the shield element is removed from the depressor button by severing the at least one flexible joint. The cradle is secured to the cap body by a plurality of cradle anchors spaced equidistance along an underside of the cradle.

The cap body further contains a truncated cone side wall. The truncated code side wall has a front wall cut-out and an opposite rear wall cut-out. A portion of the hose may be accessed from the front wall and rear wall cut-outs.

The device may further include a removable connector with at least one stem piece positioned on an outer edge of the shield element. The at least one stem piece has a plurality of threads allowing the at least one stem piece to fit onto tire stem valves of a variety of shapes, sizes and colors.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
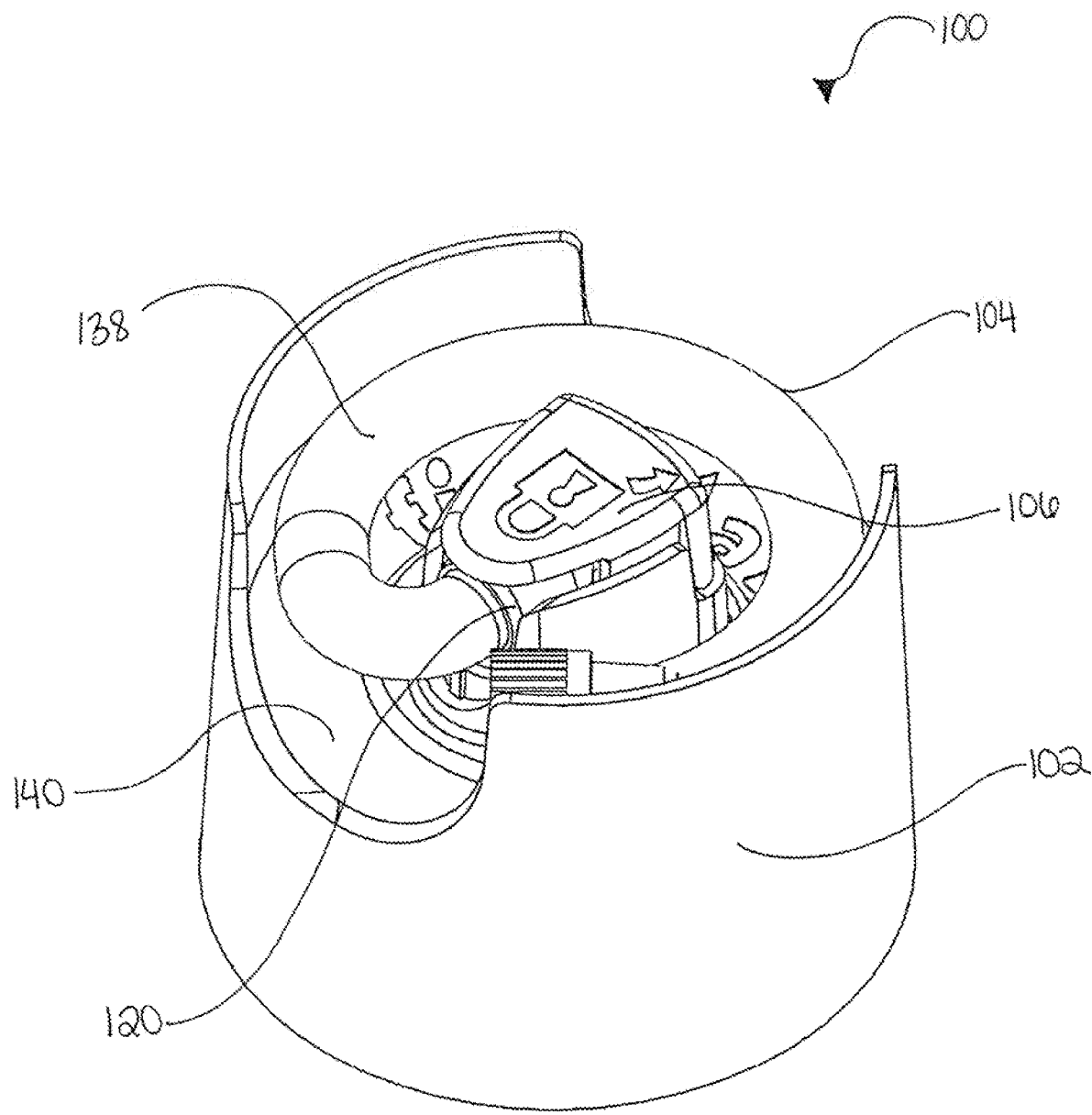
FIG. 1 shows a perspective view of a device for dispensing pressurized air and/or sealant from a pressurized can.

FIG. 1 shows a device for dispensing pressurized air and/or sealant from a pressurized can. The pressurized can includes, without limitation, pressurized air and/or sealant material to be dispensed via the device, such as into a low, flat or otherwise defective tire.

Figure 2:
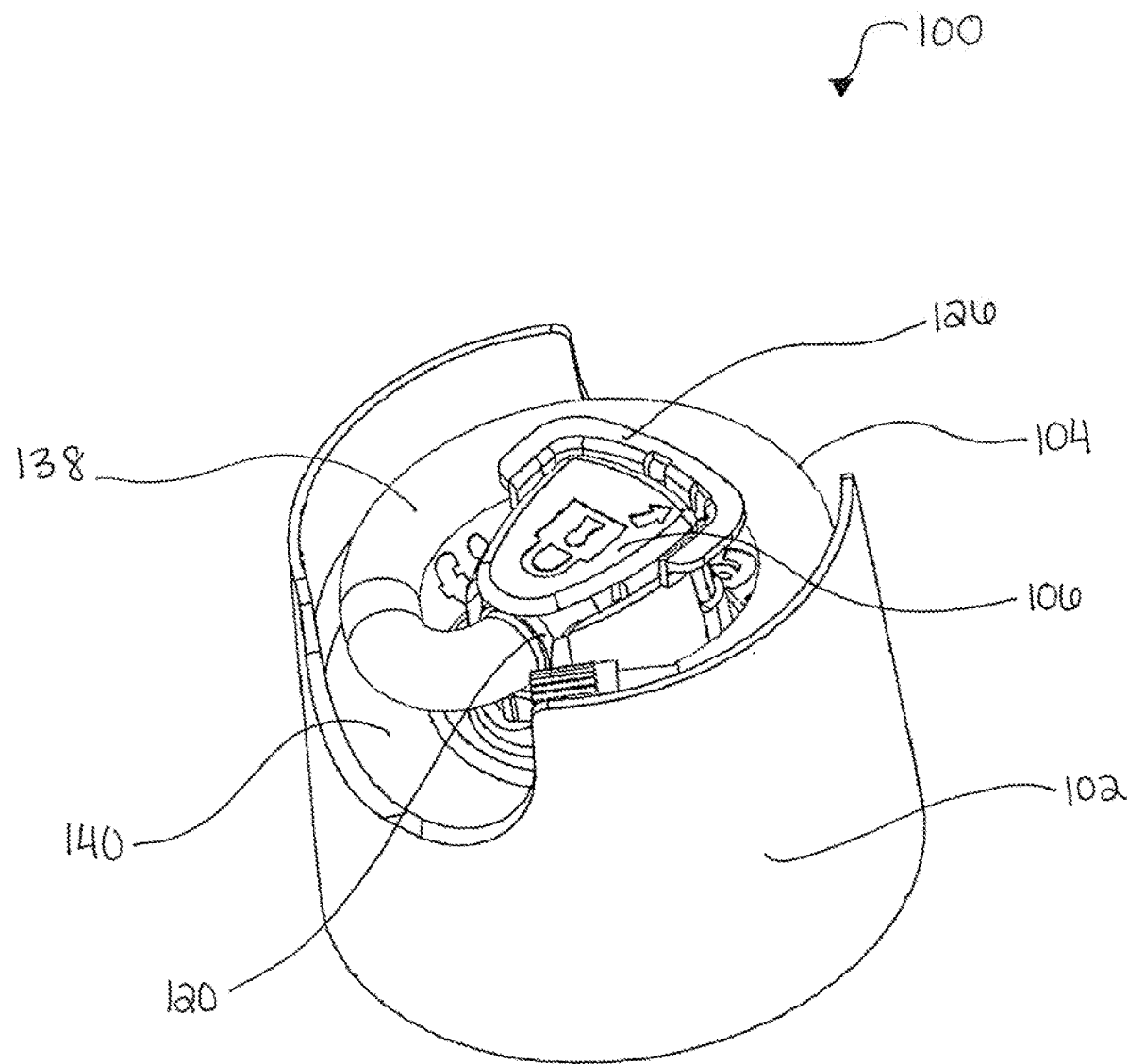
FIG. 2 shows a front perspective view of a device for dispensing pressurized air and/or sealant from a pressurized can according to a preferred embodiment of this invention.

FIGS. 2-8 show a device for dispensing pressurized air and/or sealant from a pressurized can. The device for dispensing pressurized air and/or sealant 100 includes a cap body 102 that fits on the end of a pressurized can. The cap body 102 as shown in FIG. 2 includes a depressor button 106 with an opening 120 connected to a hose 104. A length 138 of the hose 104 is wrapped around a surface 140 of the cap body 102 to allow for simple storage of the hose 104 within the cap body 102 so that the entire device 100 is self-contained.

Figure 3:
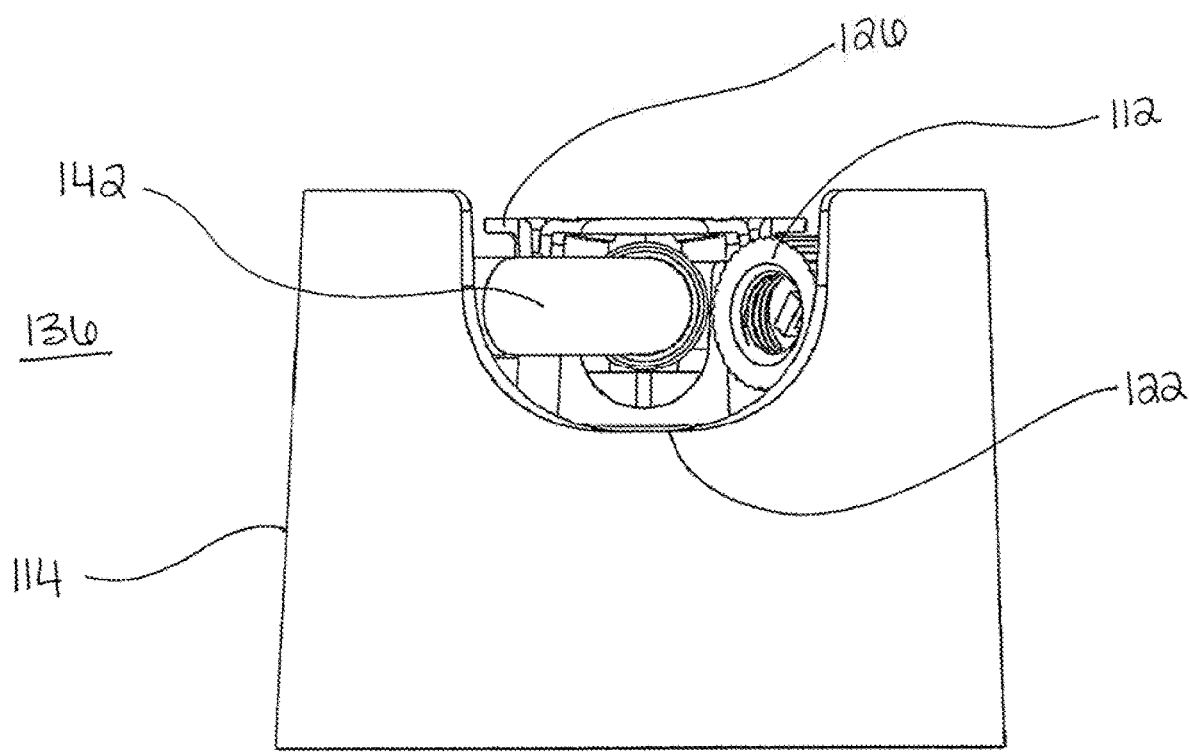
FIG. 3 shows a front view of the device for dispensing pressurized air and/or sealant according to the embodiment of FIG. 2.

As shown in FIG. 3, the hose 104 contains a stem end 112. The stem end 112 is adapted to connect to a tire stem valve 136 where the contents of the pressurized can may be expelled into the tire. The stem end 112 includes the necessary size and connection elements (e.g., internal threads) for attachment to a tire stem valve. The stem end components thereof, can vary in size, shape, amount, and/or configuration, depending on need. The hose 104 also has a first end 142 which is adapted to attach to the opening 120 of the depressor button 106.

Figure 4:
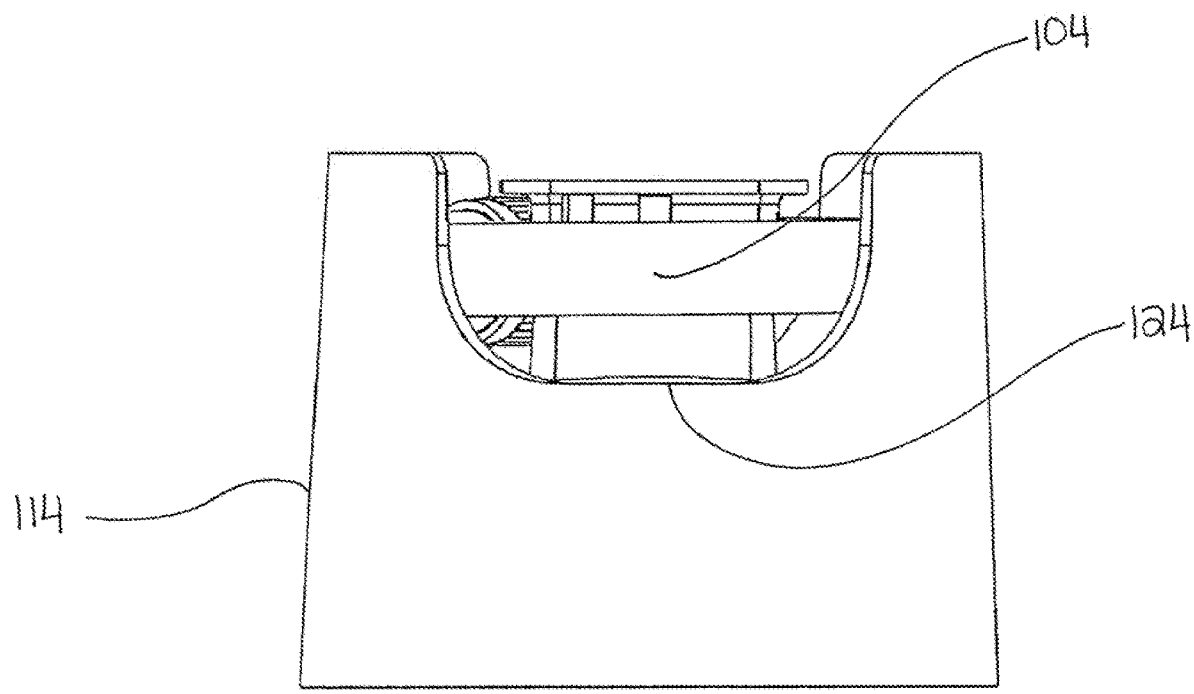
FIG. 4 shows a rear view of the device for dispensing pressurized air and/or sealant according to the embodiment of FIG. 2.
Figure 6:
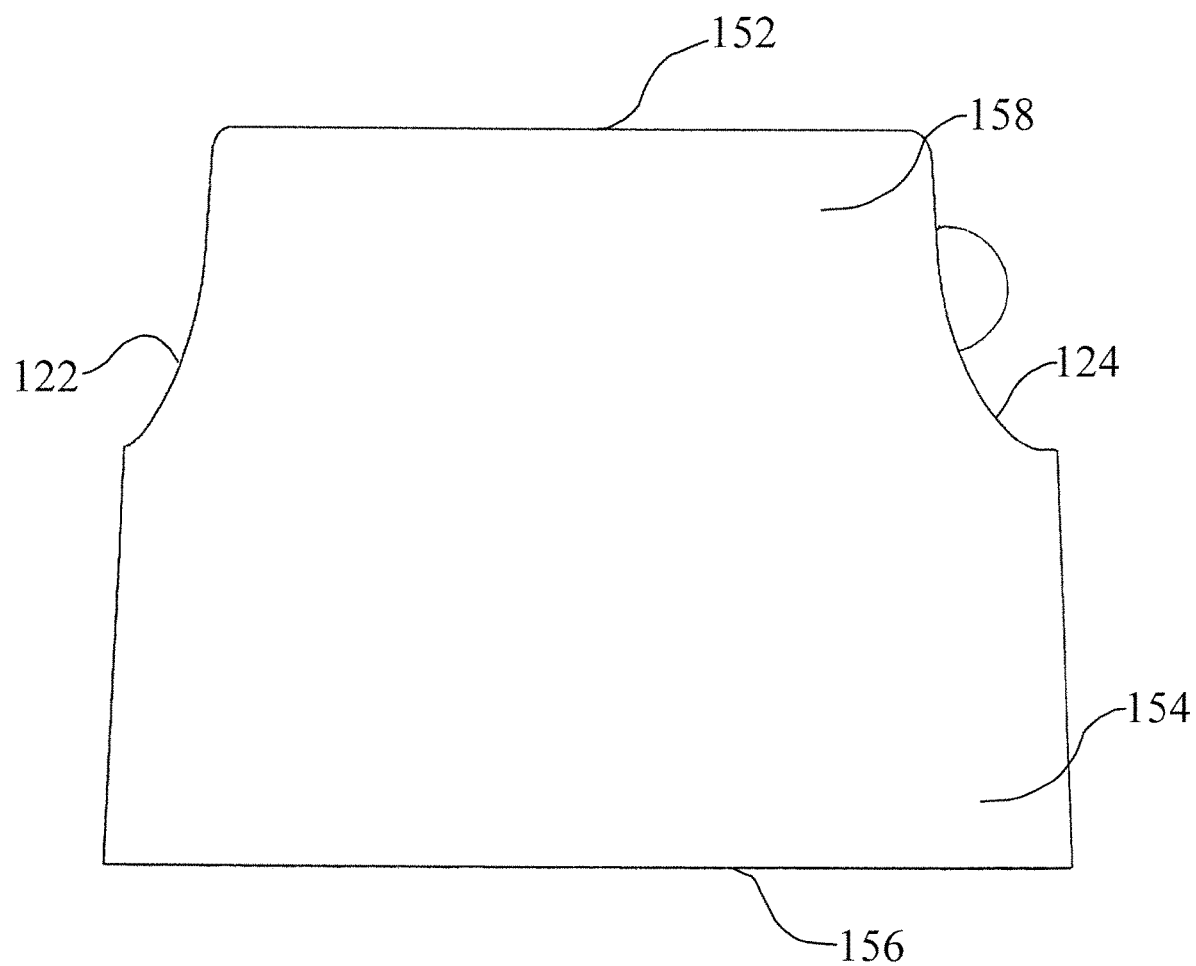
FIG. 6 shows a side view of the device for dispensing pressurized air and/or sealant according to the embodiment of FIG. 2.

FIG. 3 also shows the cap body 102 further comprising a truncated cone side wall 114. The truncated cone side wall 114 allows multiple cap bodies 102 to be stacked on top of one another for ease and improved use of space in packaging the device 100. The truncated cone side wall 114 allows the device 100 to be stackable in its manufactured state. As shown in FIGS. 3-4, the truncated cone side wall 114 has a front wall cut out 122 and a symmetrical rear wall cut out 124 opposite the front wall cut out 122. In this embodiment, the cut outs 122, 124 allow the hose 104 to be positioned in a ring around the inside of the truncated cone side wall 114 so that the hose 104 may be contained within the cap body 102 of the device 100, while the hose 104 may also be accessed for removal of the hose 104 to be extended to reach the stem valve of a tire. The hose 104 is secured in this wrapped position, against the inner surface of the side wall 114 by any suitable securing element, and is able to be partially removed for use by extending the stem end 112 to meet the tire stem of a defective tire with the necessary size and connection elements (e.g., internal threads) for attachment to a tire stem valve. FIG. 6 shows a side view of the truncated cone side wall 114 and the cut outs 122, 124, where a top 158 of the truncated cone side wall 114 has a first diameter 152, and a bottom 154 of the truncated cone side wall 114 has a second diameter 156, wherein the second diameter 156 is larger than the first diameter 152.

Figure 5:
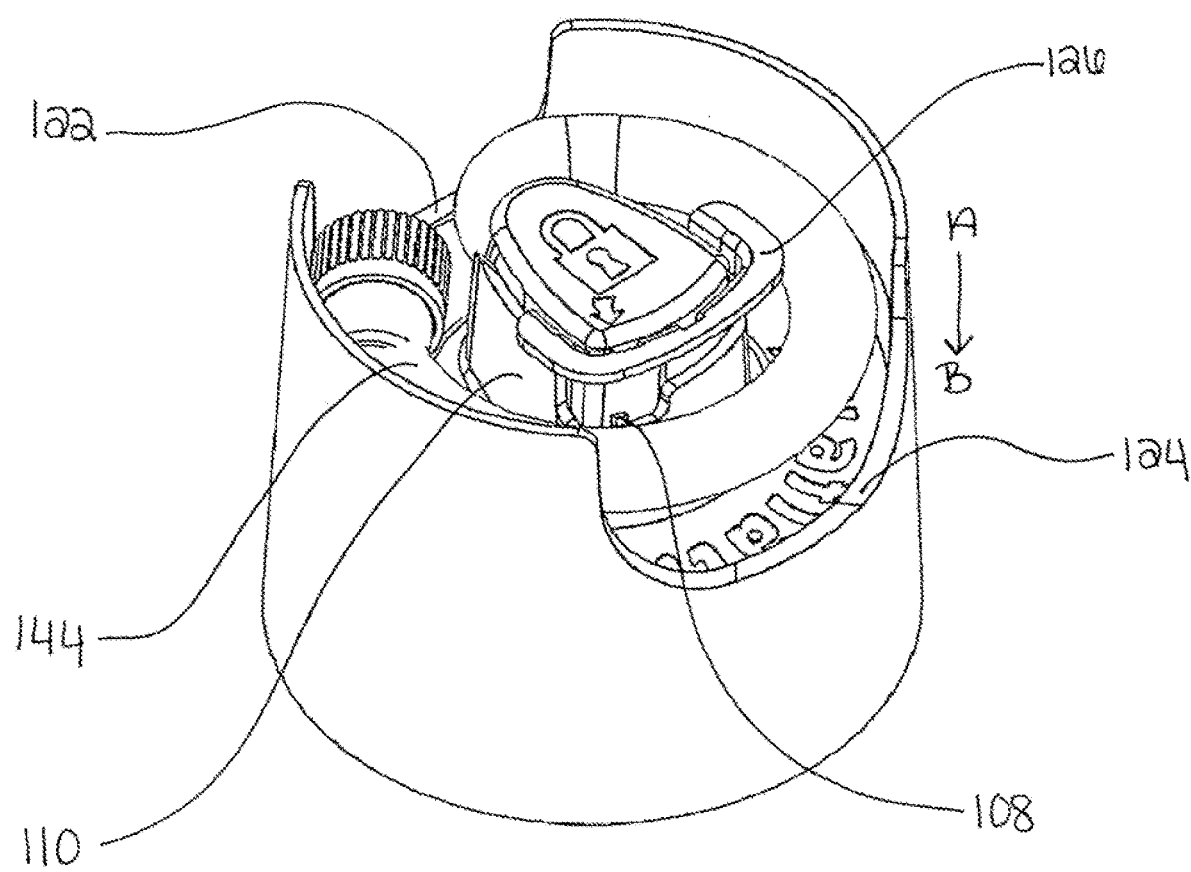
FIG. 5 shows a rear perspective view of the device for dispensing pressurized air and/or sealant according to the embodiment of FIG. 2.

FIG. 5 shows the depressor button 106 secured in a cradle 110 which contains a lock clip 108 for providing a locking mechanism. The depressor button 106 also contains a shield element 126. Both the lock clip 108 and shield element 126 work in conjunction with compression of the depressor button 106. In embodiments of this invention, the depressor button 106 has a locking mechanism built in, so when the depressor button 106 is pushed downward into the cradle 110 from point A to point B, the lock clip 108 locks the depressor button 106 in place inside the cradle 110. The lock clip 108 aids in preventing accidental discharge of the contents of the pressurized can when it is not in use, and it also allows the user to fully dispense the can contents without depressing the button 106 for the duration of product use. The shield element 126 prevents the compression of the depressor button 106 from point A to point B while the shield element 126 is attached to the depressor button 106. If an attempt to compress the depressor button 106 was performed with the shield element 126 still attached to the depressor button 106, the shield element 126 would stop compression of the depressor button 106 by interacting with the cradle 110 which would not allow the depressor button 106 to compress from point A to point B, thus keeping the pressurized can contents contained. In sum, the shield element 126 effectively works as an anti-tamper device.

Figure 7:
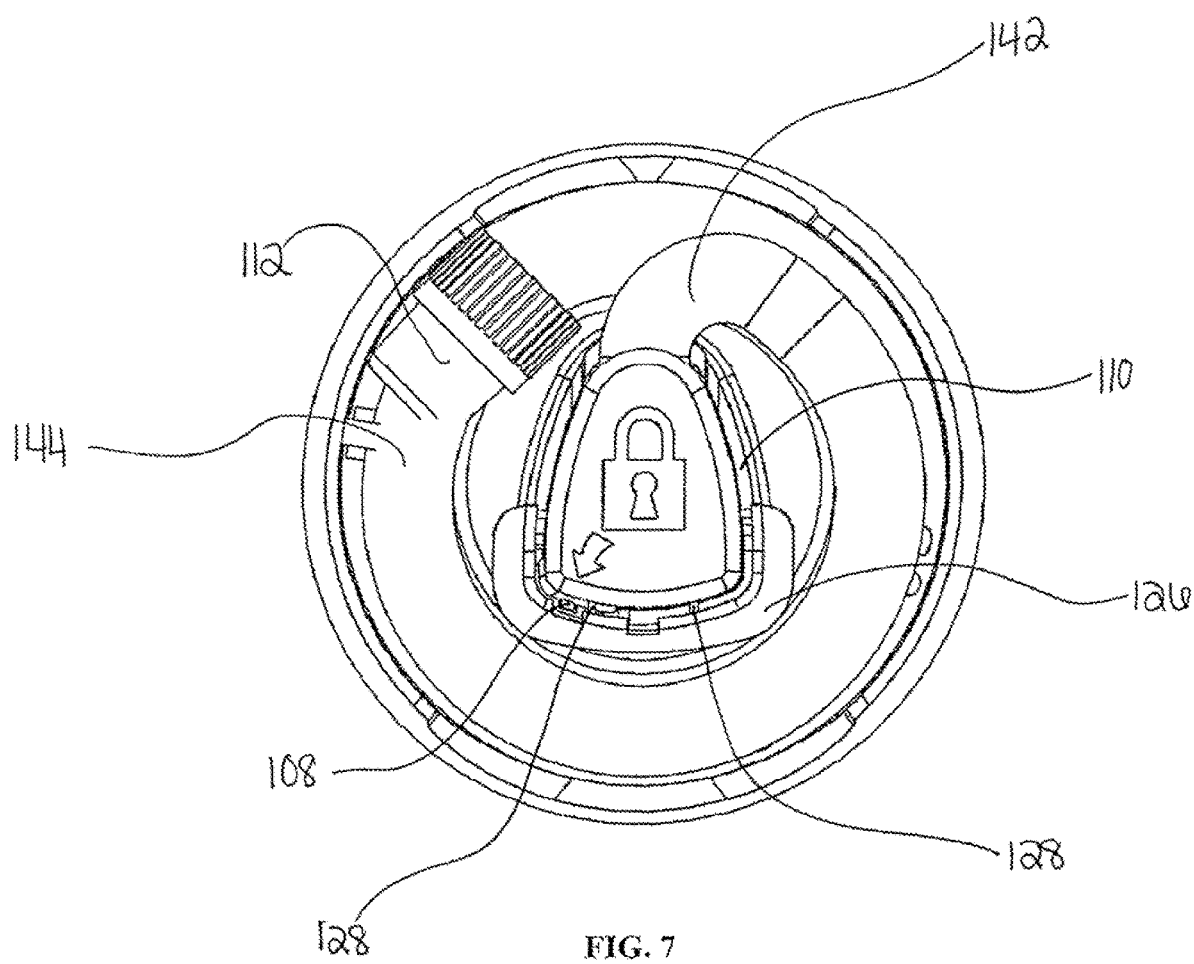
FIG. 7 shows a top view of the device for dispensing pressurized air and/or sealant according to the embodiment of FIG. 2.

FIG. 7 shows a top view of the device 100 whereby the hose 104 is wrapped around the cradle 110 on the surface 140 of the cap body 102. In addition to the first end 142 and the stem end 112, the hose further comprises an opposite end 144. When the hose 104 is in a position wrapped around the cap body 102, the opposite end 144 is adjacent and facing the first end 142 of the hose 104.

Figure 8:
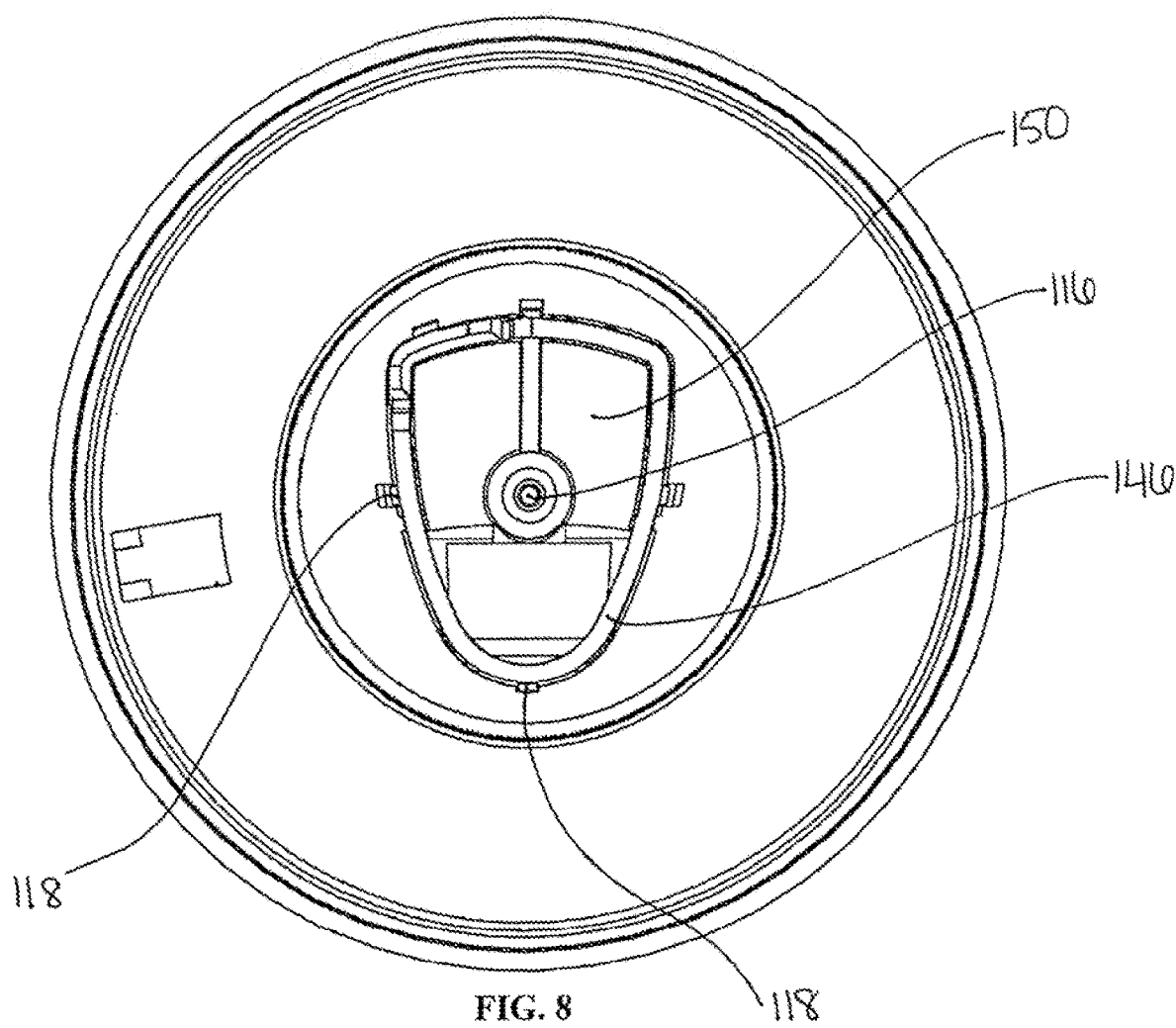
FIG. 8 shows a bottom view of the device for dispensing pressurized air and/or sealant according to the embodiment of FIG. 2.

As shown in greater detail in FIGS. 7-8, the shield element 126 contains at least one flexible joint 128. The at least one flexible joint 128 is capable of being removed from the depressor button 106, therefore allowing the detachment of the shield element 126 from the device 100. The at least one flexible joint 128 may be made from a flexible plastic, contain perforations for removal, or be made from any other combination of flexible composite known in the art. More than one flexible joint 128 may also be present on the shield element 126, where all the flexible joints are severable to allow removal of the shield element 126. Once the shield element 126 is removed from the depressor button 106, the depressor button 106 may be compressed from point A to B without interference with the cradle 110. The lock clip 108 still retains its locking mechanism in conjunction with the depressor button 106. As shown in FIG. 8, the locking mechanism also utilizes a plurality of cradle anchors 118 spaced equidistant around the perimeter of an underside 146 of the cradle 110 to allow depression of the depressor button 106. A passageway 116 is placed on an underside 150 of the depressor button 106 to allow the contents of the pressurized can to travel from the can, through the passageway 116, through opening 120, hose 104, and ultimately into the damaged tire from the stem end 112, through a fluid connection.

Figure 9:
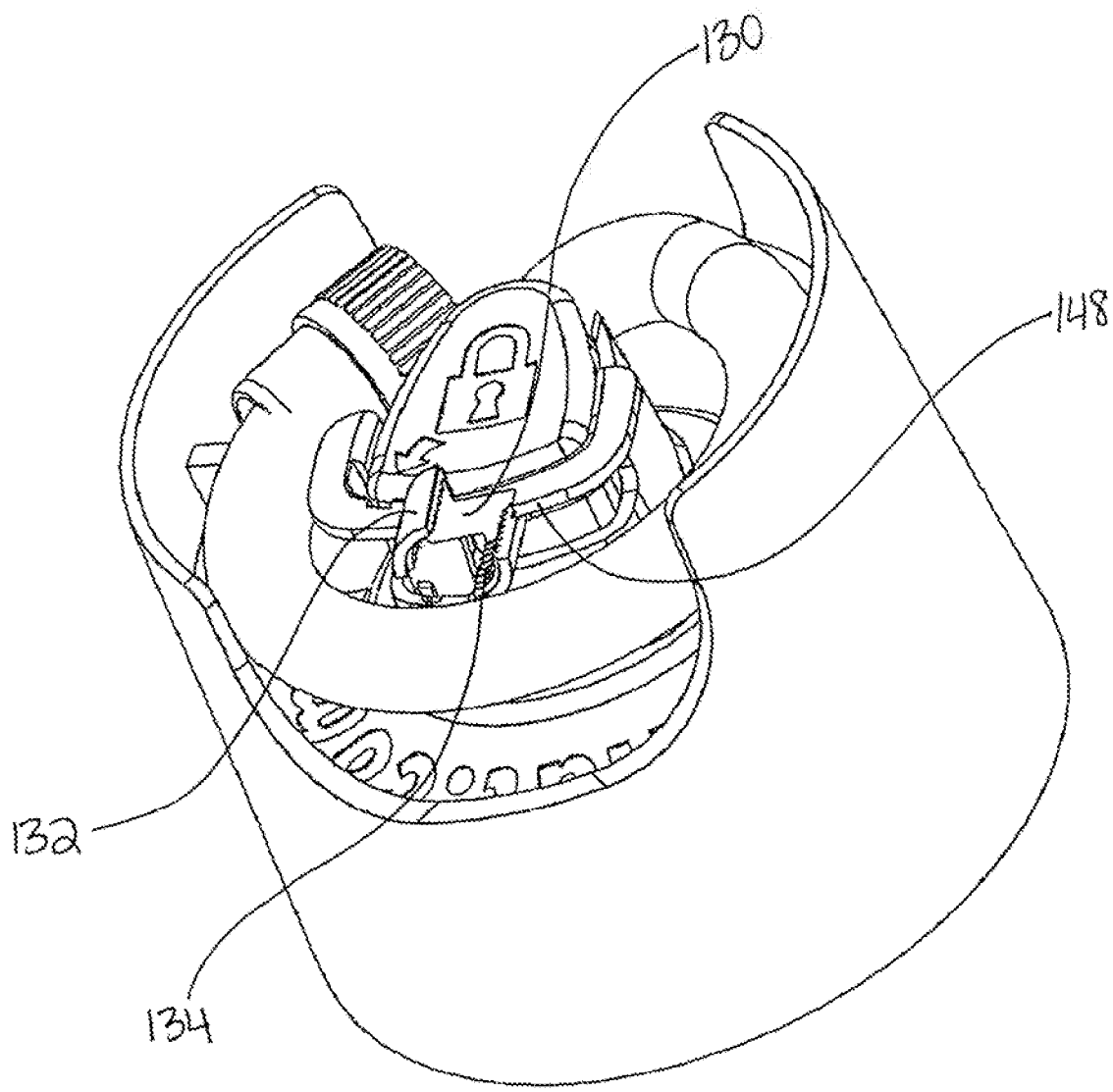
FIG. 9 shows a perspective view of a device for dispensing pressurized air and/or sealant according to another embodiment of this invention.

FIG. 9 shows another embodiment of the invention where the shield element 126 further comprises a removable connector 130 along an outer edge 148 of the shield element 126. As with the at least one flexible joint 128, the removable connector 130 is made of a flexible material that allows the removable connector 130 to be detached from the shield element 126. The removable connector 130 is comprised of at least one stem piece 132 wherein the at least one stem piece 132 is comprised of threads 134. The at least one stem piece 132 is adapted to fit onto a tire stem valve. It may be of a variety of shapes, sizes and colors to fit on any tire stem valve and is securable to said valve via the threads 134. While this embodiment utilizes threads 134, the at least one stem piece 132 may be adapted to fit onto a tire stem valve via snaps, rubber, or any other reasonable material with adhesive properties that may attach to a tire stem valve and withstand the outdoor elements. The at least one stem piece 132 allows the user of the device 100 to identify which tire(s) have been filled with air and/or tire sealant. The at least one stem piece 132 in one instance may be date stamped to also identify when the device 100 was used. The at least one stem piece 132 may also come in a variety of colors to therefore easily distinguish on which tire(s) the device 100 has been used.

While in the foregoing specification this invention has been described in relation to certain preferred embodiments thereof, and many details have been set forth for purpose of illustration, it will be apparent to those skilled in the art that the device and placard are susceptible to additional embodiments and that certain of the details described herein can be varied considerably without departing from the basic principles of the invention.

The invention claimed is:

1. A device for dispensing pressurized air and/or tire sealant from a pressurized can, the device comprising:
   a cap body;
   a depressor button in fluid communication with the pressurized can, wherein the depressor button is at least partially encompassed by a cradle, the cradle comprising a lock clip adapted to lock the depressor button in a compressed position and a plurality of cradle anchors adapted to secure the cradle to the surface of the cap body; and
   a hose positioned within the cap body and attached with respect to the pressurized can, wherein the hose is configured to attach to an opening of the depressor button, and for a length of the hose to be wrapped inside the circumference of a surface of the cap body.

2. The device according to claim 1, wherein the hose comprises a stem end configured to attach to a stem valve.

3. The device according to claim 1, wherein a first end of the hose is connectable to the opening of the depressor button and an opposite end includes the stem end configured to attach to a stem valve.

4. The device according to claim 3, wherein, in a position wrapped around the cap body, the opposite end of the hose is adjacent and facing the first end of the hose.

5. The device according to claim 1, further comprising:
a shield element at least partially encompassing the depressor button;
at least one flexible and frangible joint between the shield element and the depressor button to resist compression of the depressor button, wherein the shield element is attachable to the depressor button by the at least one flexible and frangible joint, wherein the shield element is removable from the depressor button at the at least one flexible and frangible joint, thereby eliminating the resistance to compress the depressor button.

6. The device according to claim 1, wherein the plurality of cradle anchors are spaced equidistant along an underside of the cradle.

7. The device according to claim 1, wherein the cap body further comprises a truncated cone side wall.

8. The device according to claim 7, wherein the truncated cone side wall comprises a front wall cut-out and an opposite rear wall cut-out wherein a portion of the hose is accessible from the front and rear wall cut-outs.

9. A device for dispensing pressurized air and/or tire sealant from a pressurized can, the device comprising:
a cap body;
a depressor button in fluid communication with the pressurized can, wherein the depressor button is at least partially encompassed by a cradle, the cradle comprising a lock clip adapted to lock the depressor button in a compressed position;
a shield element at least partially encompassing the depressor button;
at least one flexible and frangible joint between the shield element and the depressor button to resist compression of the depressor button, wherein the shield element is attachable to the depressor button by the at least one flexible and frangible joint, wherein the shield element is removable from the depressor button at the at least one flexible and frangible joint, thereby eliminating the resistance to compress the depressor button;
a hose positioned within the cap body and attached with respect to the pressurized can, wherein the hose is configured to attach to an opening of the depressor button, and for a length of the hose to be wrapped inside the circumference of a surface of the cap body; and
wherein the shield element further comprises a removable connector with at least one stem piece positioned on an outer edge of the shield element, wherein the at least one stem piece is configured to attach on a stem valve via a plurality of threads, and wherein the at least one stem piece is adapted to fit stem valves of a variety of sizes, shapes and colors.

10. A device for dispensing pressurized air and/or tire sealant from a pressurized can, the device comprising:
a cap body adapted to attach to the pressurized can;
a hose extending from the cap body having an end configured to attach to a stem valve, the hose positioned on a surface of the cap body;
a depressor button positioned in a cradle on the surface of the cap body, the depressor button comprising an opening, wherein the hose is adapted to protrude from the opening, wherein the cradle is secured to the cap body by a plurality of cradle anchors; and
a shield element at least partially surrounding the depressor button, wherein the shield element is removably connected to the cradle by at least one flexible joint.

11. The device according to claim 10, wherein the shield element prevents compression of the depressor button when the shield element is connected to the cradle by the at least one flexible joint.

12. The device according to claim 11, further comprising a lock clip positioned within the cradle configured to secure the depressor button in a compressed state when the shield element is removed.

13. The device according to claim 10, wherein the depressor button further comprises a passageway on an underside of the depressor button through which tire air/sealant may pass through the opening.

14. The device according to claim 13 wherein air/sealant may further pass through the hose and into a stem valve.

15. The device according to claim 10, the cap body further comprising a truncated cone side wall wherein a top of the cap body has a first diameter, and a bottom of the cap body has a second diameter that is larger than the first diameter.

16. The device according to claim 15, wherein the truncated cone side wall further comprises a front wall cut out at the surface of the cap body, and a rear wall cut out at the surface of the cap body.

17. The device according to claim 10, wherein the shield element further comprises a removable connector with at least one stem piece positioned on an outer edge of the shield element.

18. The device according to claim 17, wherein the at least one stem piece is configured to attach on a stem valve via a plurality of threads, wherein the at least one stem piece is adapted to fit stem valves of a variety of sizes, shapes and colors.

19. A device for dispensing pressurized air and/or tire sealant from a pressurized can, the device comprising:
a cap body adapted to attach to the pressurized can;
a hose extending from the cap body having an end configured to attach to a stem valve, the hose positioned on a surface of the cap body;
a depressor button positioned in a cradle on the surface of the cap body, the depressor button comprising an opening, wherein the hose is adapted to protrude from the opening; and
a shield element at least partially surrounding the depressor button, wherein the shield element is removably connected to the cradle by at least one flexible joint, wherein the shield element further comprises a removable connector with at least one stem piece positioned on an outer edge of the shield element.

20. The device according to claim 19, wherein the cradle is secured to the cap body by a plurality of cradle anchors.

* * * * *